Nov. 27, 1934.   L. F. NENNINGER   1,982,265
SPINDLE MOUNTING
Filed June 25, 1932    4 Sheets-Sheet 1

Inventor
LESTER F. NENNINGER
By
Attorney

Nov. 27, 1934.   L. F. NENNINGER   1,982,265
SPINDLE MOUNTING
Filed June 25, 1932   4 Sheets-Sheet 3
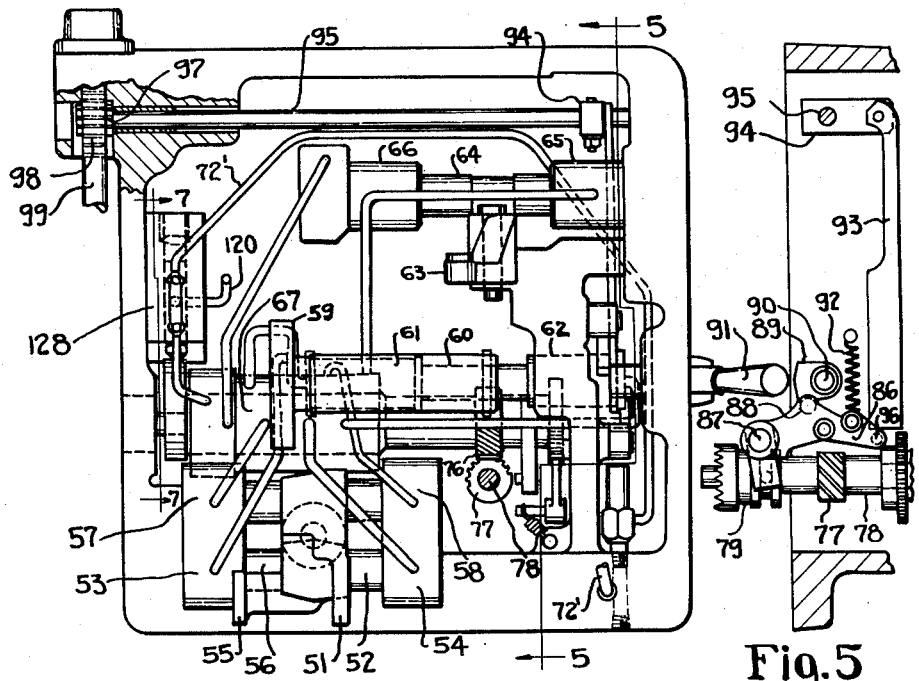
Fig. 4
Fig. 5
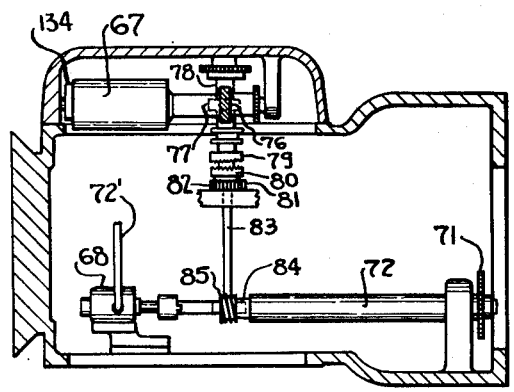
Fig. 6
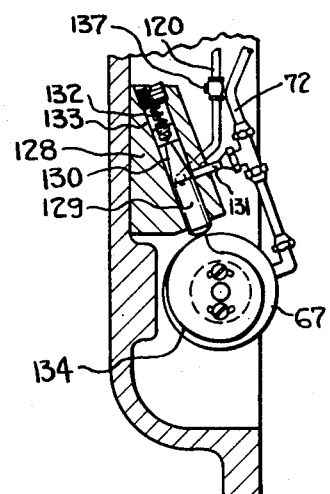
Fig. 7
Inventor
LESTER F. NENNINGER
By A. K. Parsons
Attorney Patented Nov. 27, 1934

1,982,265

UNITED STATES PATENT OFFICE 1,982,265

SPINDLE MOUNTING

Lester F. Nenninger, Cincinnati, Ohio, assignor to The Cincinnati Milling Machine Company, Cincinnati, Ohio, a corporation of Ohio Application June 25, 1932, Serial No. 619,308

19 Claims. (Cl. 90—18)

This invention relates to spindle mountings for machine tools and more particularly to improvements in adjusting mechanism therefore.

Many types of machine tools have an ultimate driven member in the form of a spindle which is utilized for effecting some form of relative movement between tool and work, of which milling machines, for instance, constitute a good example. Such machines are designed for universal adaptation to all kinds of work, and the cutter spindle, as a part of such machine, must be therefore capable of a wide range of speeds without excessive vibration or chatter. This is difficult to obtain with present spindle mountings because one adjustment, which is suitable for low speeds and heavy loads is not satisfactory for high speeds, while a suitable high speed adjustment will be too loose and cause chatter at low speeds. Furthermore it is not desirable to trust the adjustment of spindle bearings to the ordinary machine tool operator.

One of the objects of this invention therefore is to overcome the above difficulties by providing means for automatically controlling the pressure on a spindle bearing in accordance with the speed at which it is rotated.

Another object of this invention is to improve the performance of machine tools by maintaining a proper fit between the cutter spindle and its bearing at all times throughout its full range of speeds so that uniform results as well as accuracy may be obtained throughout the range of the machine.

A further object of this invention is to provide an automatic preloader for a spindle bearing which will act in conjunction with a speed rate determinator therefore to reduce the pressure on the bearing as the speed increases or to increase the pressure on the bearing as the speed decreases.

An additional object of this invention is to provide an hydraulically actuated pre-loader for machine tool spindles which may be operated in conjunction with power actuated rate change mechanism whereby the load on the bearing will be automatically changed as the rate is varied, thereby relieving the operator of any duty in this connection.

Other objects and advantages of the present invention should be readily apparent by reference to the following specification considered in conjunction with the accompanying drawings illustrative of one embodiment thereof, but it will be understood that any modifications may be in the specific structural details thereof within the scope of the appended claims without departing from or exceeding the spirit of the invention.

Referring to the drawings in which like reference numerals indicate like or similar parts:

Figure 4 is an elevation of the speed change bracket as viewed from the inside of the machine.

Figure 5 is an elevation on the line 5—5 of Figure 4.

Figure 6 is a plan view showing the power transmission to the selector valve.

Figure 7 is an end view showing the pre-loader cam attached to the end of the selector valve.

Figure 1:
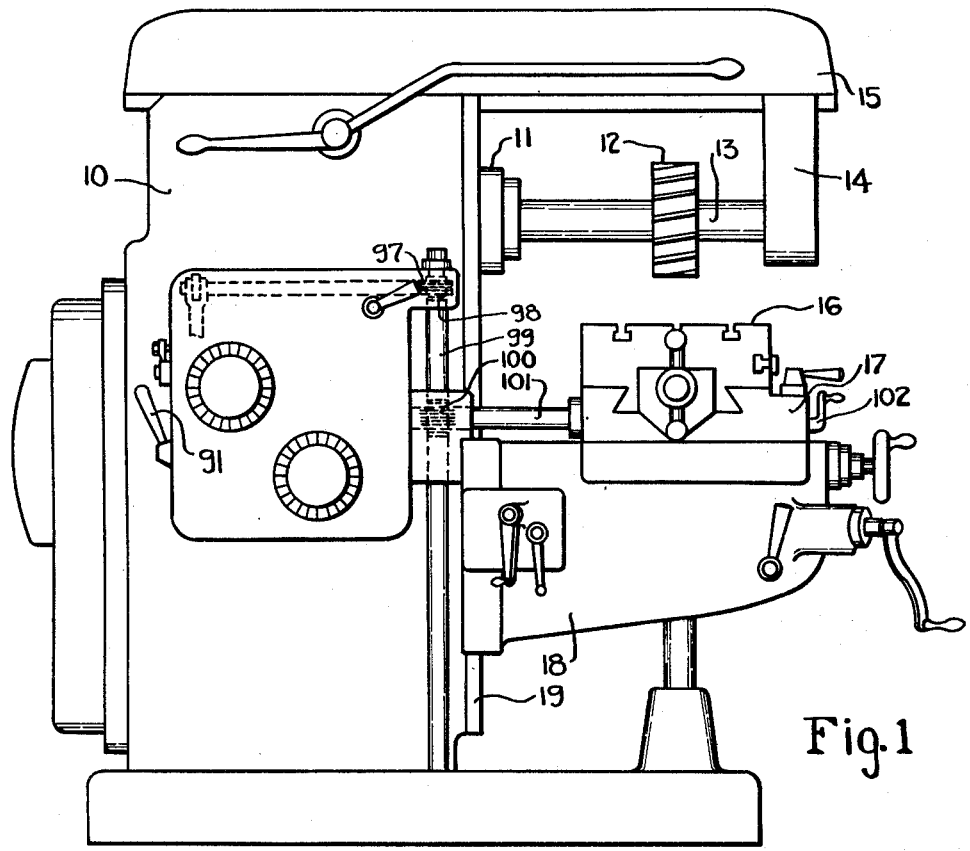
Figure 1 is a side elevation of a machine tool embodying the principles of this invention.

This invention may best be illustrated in connection with a milling machine, such as shown in Figure 1, having a column 10 for supporting a spindle 11 in the upper part thereof, the spindle being utilized in this instance for rotating a cutting tool 12 secured to an arbor 13. The arbor is attached at one end to the spindle for rotation thereby and supported at the outboard end by a pendant 14 adjustably mounted on the end of an over-arm 15 adjustably mounted in the top of the column. As is usual practice in such machines, the work is secured to a table 16 reciprocably mounted upon a saddle 17 for feeding the work past the cutter. The saddle is transversely adjustable toward and from the column upon a knee 18, which in turn is vertically adjustable upon guideways 19 formed upon the front face of the column whereby the work may be bodily adjusted in two directions relative to the spindle.

Since the work to be machined may be large, requiring wide cutters subjected to heavy loads and necessitating low speeds as well as small work which may be finished by small cutters running at high speed, it is apparent that the cutter spindle must be capable of rotation through a wide range of speeds and for that reason is almost generally actuated by a variable speed transmission.

Figure 3:
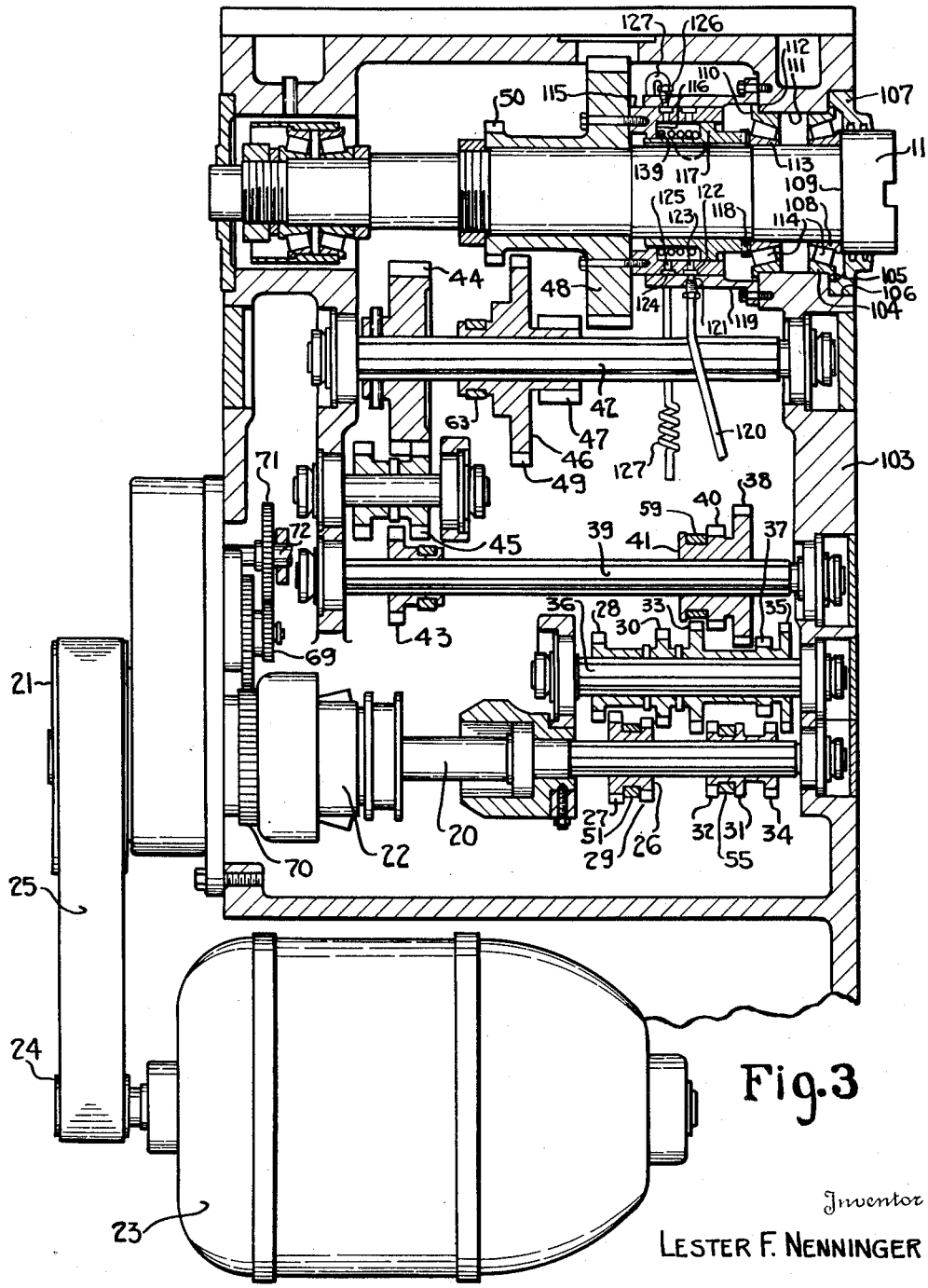
Figure 3 is an expanded view of a variable speed transmission for the cutter spindle.

Such a variable speed transmission is illustrated in Figure 3 and comprises a main drive shaft 20 which may be selectively coupled to a driving pulley 21 by means of a starting clutch 22. The pulley 21 may be actuated by a suitable prime mover such as an electric motor 23 having a pulley 24 which is coupled to the pulley 21 by means of a suitable belt or chain 25.

The shaft 20 has a gear couplet 26 splined thereon for axial shifting in opposite directions to couple gear 27 thereof with fixed gear 28; or gear 29 thereof with fixed gear 30. A second couplet 31 is splined on the shaft for meshing gear 32 thereof with fixed gear 33; or gear 34 thereof with fixed gear 35. All of the fixed gears are secured to shaft 36 which also has an additional gear 37 keyed thereto for operative engagement with shiftable gear 38 slidably mounted on shaft 39, the gear 38 having integral therewith a second gear 40 whereby movement of the couplet 41 in the opposite direction will mesh gear 40 aforementioned with gear 33. By means of these three shiftable units, the shaft 39 may be rotated at any one of eight different speeds.

A back gear shaft 42 is journaled in the column parallel to shaft 39 and operatively coupled thereto by means of shiftable gear 43 slidably splined on shaft 39 directly meshing with gear 44 fixed to the backgear shaft for rotation in one direction or directly coupled thereto by means of an idler 45 interposed between the gear 43 and the gear 44 for rotation in the opposite direction. A slidable couplet 46 is mounted on the shaft 42 and comprises a pinion gear 47 movable into mesh with bull gear 48 secured to the spindle upon movement of the couplet to the right, and gear 49 movable into mesh with a gear 50 secured to the spindle upon movement of the couplet to the left. This shiftable couplet multiplies the eight speeds of shaft 39 into sixteen speeds. A sixteen speed transmission has thus been provided in connection with the spindle but it will of course be apparent that transmissions having different ranges from the one illustrated may be utilized without departing from the spirit of this invention.

The couplets 26, 31, 41 and 46 may be shifted by suitable mechanism which is preferably under the control of a single member. Such shifting means may be mechanically actuated, as by cams, or hydraulically actuated as by pistons and cylinders. Either type of shifting mechanism lends itself to unitary control and therefore only one type will be illustrated.

Figure 8:
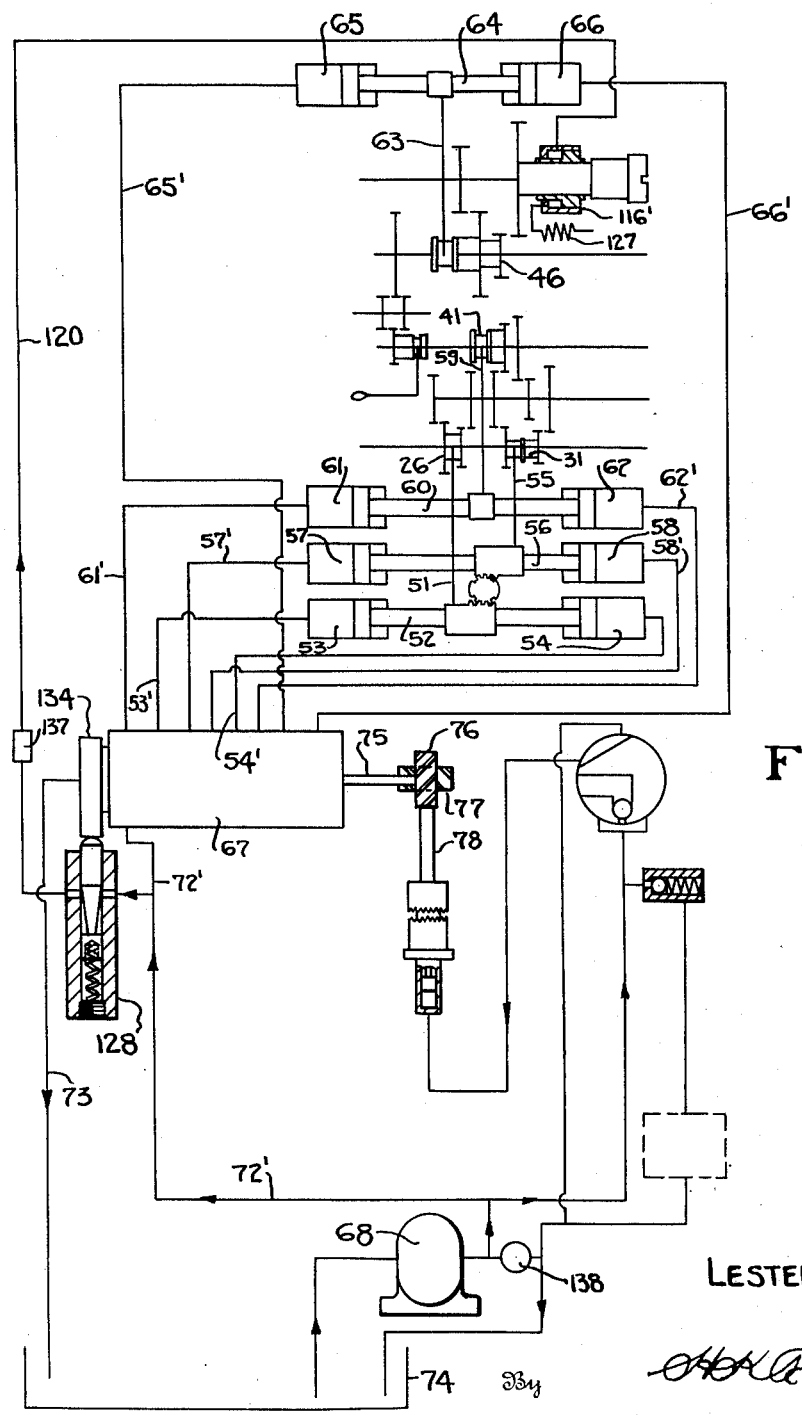
Figure 8 is a diagram of the hydraulic circuit of the machine.

As diagrammatically shown in Figure 8, couplet 26 is provided with a shifter fork 51 secured to the piston rod 52 which is slidably mounted at opposite ends in cylinders 53 and 54; the couplet 31 is provided with the shifter fork 55 integrally secured to the piston 56 slidably mounted at opposite ends in cylinders 57 and 58; couplet 41 is provided with the shifter 59 integrally secured to the piston 60 slidably mounted at opposite ends in cylinders 61 and 62, and the couplet 49 is provided with the shifter fork 63 integrally secured to the piston 64 slidably mounted at opposite ends in cylinders 65 and 66. The shifting of these various members in predetermined order will effect a geometric progression of speed rates under the control of a single member in the form of a selector valve 67 to which all the cylinders are connected by separate channels, the cylinders 53 and 54 being connected by channels 53' and 54'; cylinders 57 and 58 being connected by channels 57' and 58'; cylinders 61 and 62 being connected by channels 61' and 62'; and the cylinders 65 and 66 being connected by channels 65' and 66'.

Hydraulic pressure is supplied to the selector valve by means of a pump 68 which is mounted in the column as shown in Figure 6. This pump is power driven by means of the gear train shown in Figure 3, and indicated generally by the reference numeral 69. This train is driven by the gear 70 which is constantly rotated by the pulley 21, and it terminates in a gear 71 secured to the horizontal shaft 72. As shown in Figure 5 this shaft extends to the forward part of the machine where it is operatively coupled to the pump 68 so that during operation of the prime mover, the pump will be continuously driven. A channel 72' couples the pump to the selector valve which in turn directs the pressure to the proper cylinders to effect the speed corresponding to the rotatable position of the valve, the remaining cylinders being connected by the valve to the return line 73 extending to the reservoir 74 located in the lower part of the machine.

Since the transmission illustrated herein is capable of yielding sixteen speeds, the selector valve is provided with sixteen stations, or in other words one complete revolution of the selector valve will effect the sixteen speeds in geometrically progressive order.

The selector valve may be rotatably positioned in any one of these positions by either manual or power means, the latter being preferable because of its convenience. To this end the valve stem 75, as shown in Figures 5 and 7, is provided with a spiral gear 76 meshing with a spiral gear 77 secured to the end of horizontal shaft 78. This shaft is provided with a slidable clutch member 79 adapted to engage the clutch member 80 integral with gear 81 mounted for free rotation on the shaft 78. A second gear 82 underlying the gear 81 and fixed to the end of shaft 83 is utilized for effecting rotation of the clutch member 80, the shaft being coupled to the continuously rotating shaft 72 by means of a pair of spiral gears 84 and 85.

The clutch member 79 is adapted to be shifted by means of a bell crank 86 pivotally mounted at 87 to a fixed part of the machine and having a roller 88 engageable by cam 89 secured to the end of rock shaft 90 having the handle 91 secured to the outer end thereof. A spring 92 serves to disengage the clutch upon release of the manual operating means. The clutch may also be operated from the front of the machine by means of the following mechanism.

A reciprocable link 93 is pivotally connected at one end to a crank arm 94 keyed to a rock shaft 95. The lower end of the link 93 engages a roller 96 secured to the end of the bell crank so that downward movement of the link will effect clutch engagement while upward movement will permit the spring 92 to come into action to effect withdrawal of the clutch. The rock shaft 95 extends transversely of the gear shifter bracket as shown in Figure 4 and on the other end is provided with longitudinal gear teeth 97 meshing with rack teeth 98 secured to the upper end of the vertically reciprocable rod 99 which is operatively coupled by rack and gear connection 100 to the horizontal telescoping shaft 101. This telescoping shaft is secured in the saddle 17 and is extended through the forward side thereof where it is provided with a manual operating lever 102. From this it will be seen that the selector valve control clutch 79 may be operated from a position at the side of the machine or from an operating position at the front of the machine.

As shown in Figure 3, the cutter spindle 11 is journaled in the forward wall 103 of the column by means of antifriction bearings. The outer race 104 of one of the bearings is provided with a shoulder 105 by means of which it is held in the counter-bore 106 by the member 107 threaded in the counterbore. The inner race 108 is secured on the spindle against the shoulder 109 thereof.

A second outer race 110 is mounted in the opposite end of the bore 111 and provided with a shoulder 112 engaging the inner face of the bore. A second inner race 113 is slidably mounted on the spindle 11 for adjusting movement toward and from the inner race 108. Taper roller bearings 114 are interposed between each pair of races and inclined toward one another. Any looseness in the bearing is taken up by moving the inner races 108 and 113 toward one another. These relative movements are effected by providing a slip ring 115 which is attached to the face of the gear 48 having a counter-bore 116 formed in the end thereof to constitute a bearing preloading cylinder 116' and a piston member 117 slidably mounted in the bore, one end of the piston engaging the inner race 113. By admitting pressure to the cylinder, it will be seen that the members 115 and 117 will move in opposite directions thereby causing the inner races 108 and 113 to approach one another thereby tightening the bearing.

To insure rotation of the inner race with the spindle the member 117 is splined on the spindle 11 and provided with lugs 118 integrally formed on the end thereof which fit into similar shaped recesses formed in the end face of the inner race 113. Upon rotation of the spindle, the gear 48 and member 115, the piston 117 and the inner races 113 and 108 will rotate together as a unit.

An outer sleeve member 119 is fixed to the wall of the column and surrounds the slip ring 115 for the purpose of providing connections to the cylinder during rotation thereof. A pressure channel 120 is threaded in the sleeve having a port 121 which registers with an annular groove 122 formed in the periphery of the member 115, the groove having radial ports 123 therein communicating with the cylinder. The groove 122 is of sufficient width to permit the necessary axial movement of the spindle in order to effect proper tightening of the bearing. A second annular groove 124 is formed in the periphery of the slip ring and has radial ports 125 communicating with the interior of the cylinder. A second channel 126 is threaded in the periphery of the sleeve member 119 in registry with the annular groove 124. This channel terminates in a coiled bleeder pipe 127 which in part determines the pressure in the bearing preloading cylinder. By connecting the bleeder coil to the top of the cylinder, it also permits the air to be forced out of the cylinder upon initial operation of the machine. If so desired, a check valve 137 may be inserted in the line 120 to maintain the cylinder full of oil and insure quicker operation of the device.

Figure 2:
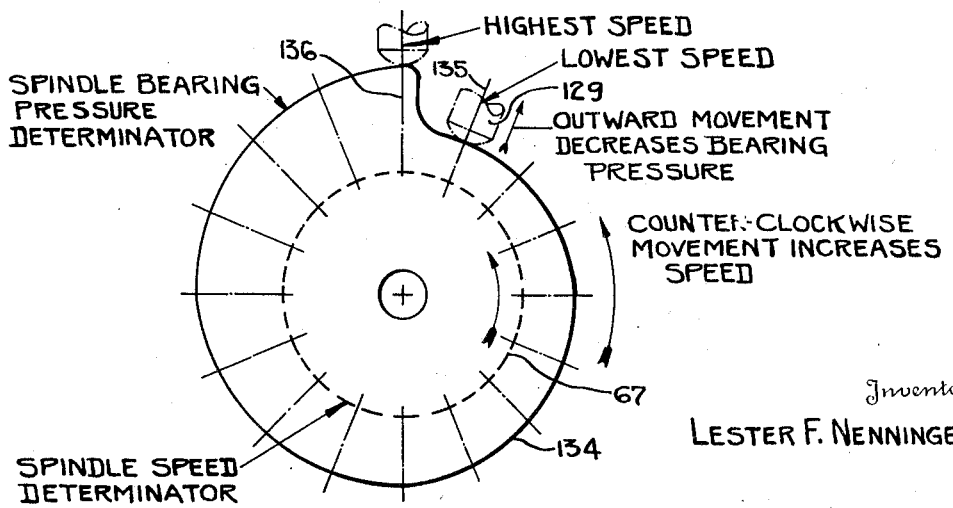
Figure 2 is a diagram illustrating the automatic control of the pre-loader in conjunction with the speed determinator.

The channel 120 is extended to couple with the pressure channel 72 leading to the selector valve 67 as shown more particularly in Figures 7 and 8. A control valve 128 is interposed in channel 120 for throttling the pressure to the cylinder 116 in accordance with the speed of rotation of the spindle. This valve has a reciprocable plunger 129 in the middle portion of which is formed an axially tapered annular groove 130 which in the position shown in Figure 6 will be in a position to nearly close the pressure port 131 and thereby reduce the pressure in the cylinder 116 to a minimum. A spring 132 is mounted in the end of the plunger bore 133 to effect outward movement of the plunger when so permitted by the shape of the control cam 134. This cam is continuously rotated in a counter-clockwise direction by the selector valve to which it is attached. As shown in Figure 2 one rotation of the selector valve is divided into sixteen stations beginning at 135 which represents the lowest speed and continuing in a clockwise direction to the highest speed represented by the line 136. Since the stations are so arranged around the valve in a clockwise direction it will be seen that rotation of the valve in a counter-clockwise direction will effect a gradual increase in rate of rotation of the spindle. The periphery of the cam 134 is therefore given a spiral shape, the radius of which along the line 135 will be the shortest, gradually increasing in length to the line 136 at which point the radius is the longest. It will thus be seen that as the cam 134 is rotated by the selector valve that the plunger 129 will be gradually moved outward to decrease the pressure on the bearing as the selector valve is rotated to increase the speed of rotation of the spindle which variation is possible due to the fact that all the oil from the pump is not conducted through the control valve.

Attention is invited to the fact that the bleeder coil exhausts to atmosphere and therefore the branch line 120 is always open which permits a constant flow to occur therein at all times during operation of the pump and this is necessary in order to have the throttle valve function as a pressure variator. If the bleeder coil was disconnected from the cylinder and its port closed, the cylinder would similize a closed vessel and the pressure therein would soon build up to pump pressure regardless of whether the line 120 had a throttle valve therein or not, and therefore any variation in the setting of the throttle valve would be ineffectual. Since the bleeder coil discharges to atmosphere, or in other words at atmospheric pressure, a drop in pressure will occur across the branch line from pump pressure to atmospheric pressure. Part of this drop will occur across the resistance represented by the throttle valve 128 and the remaining drop across the bleeder coil 127. It will thus be seen that the pressure in the cylinder depends upon the drop in pressure across the bleeder coil, or in other words on the pressure that the resistance of the bleeder coil will develop. This pressure will vary according to the flow therethrough which in turn will depend upon the setting of the throttle valve 128. The bleeder therefore resists the flow of fluid to atmosphere, or in other words causes an accumulation of fluid in the cylinder which raises the pressure. As the throttle valve is opened, more fluid is forced into the branch line if such is possible and the pressure increases. As the throttle is closed less fluid is admitted and the pressure drops because the amount coming in more nearly equals the capacity of the bleeder coil to discharge it. Thus the various positions of the throttle valve determine the pressure in the cylinder 116'. If so desired, a spring 139 may be inserted in the bearing preloading cylinder 116' to maintain an initial preload on the bearing. If so desired, an adjustable throttle valve similar to the throttle valve 128 may be utilized in place of the bleeder coil in which case it will be noted that adjustment thereof would then change the range of pressures developed by throttle valve 128.

A mechanism has thus been provided for automatically varying the pressure on the spindle bearing of a milling machine in accordance with the speed of the spindle, the latter being determined by speed varying mechanism so that it is unnecessary for the operator of the machine to tamper with the mechanism and which is so arranged that at low speeds when the cuts are heavy the bearing will be preloaded to a sufficient extent to prevent chatter and vibration while at the high speeds the preloading of the bearing will be relieved to prevent excessive heating of the parts and possible damage thereto. The invention has been illustrated in connection with a mechanical variable speed transmission but it will be apparent that it may be equally well applied to rate control mechanism of hydraulic speed variators such as shown in copending application of Hans Ernst and Lester F. Nenninger, Serial Number 483,861, filed September 23, 1930.

That which is claimed is:

1. A machine tool comprising a support, a rotatable member, means for journaling said rotatable member in the support comprising concentric bearing portions relatively axially movable to vary the load carrying capacity thereof, a transmission including change speed mechanism for effecting rotation of said member and power operated means controlled by said mechanism for varying the relative axial position of said concentric members in accordance with the rate of rotation of the member.

2. A machine tool including a support member, a power actuated rotatable member, means to effect speed changes of the rotatable member, means to journal one of the members in the other including a pair of relatively rotatable bearing members, anti-friction wedge means interposed between the bearing members, said bearing members being relatively movable to vary the pressure therebetween, and power actuated means responsive to speed changes of the rotatable member to effect said movement whereby the pressure between the bearing members will be varied in accordance with the speed of rotation of the rotating part.

3. A machine tool including a support member, a power actuated rotatable member, means to effect speed changes of the rotatable member, means to journal one of the members in the other including a pair of relatively rotatable bearing members, anti-friction wedge means interposed between the bearing members whereby relative movement of one bearing member toward the other will vary the pressure therebetween, power actuated means to effect said relative movement whereby the pressure between the bearing members may be varied in accordance with the speed of rotation of the rotating part, said power actuated means including an hydraulically actuated motor, a source of pressure and valve means responsive to speed changes of the rotatable member to determine the application of pressure to said motor.

4. A machine tool including a support member, a power actuated rotatable member, means to effect speed changes of the rotatable member, means to journal one of the members in the other including a pair of relatively rotatable bearing members, anti-friction wedge means interposed between the bearing members, whereby relative movement will vary the pressure therebetween, hydraulically actuated means to effect said movement including a piston and cylinder, means to fix the piston to one of said bearing members, and the cylinder to the other member, a source of pressure and valve means adjustable in response to speed changes of the rotatable member for determining the flow of pressure to said cylinder.

5. A machine tool including a support member, a power actuated rotatable member, means to effect speed changes of the rotatable member, means to journal one of the members in the other including a pair of relatively rotatable bearing members, anti-friction wedge means interposed between the bearing members, said members being relatively movable toward one another to vary the pressure of the bearing, hydraulically actuated means to effect said movement including a piston and cylinder, means to fix the piston to one of said bearing members, and the cylinder to the other member, a source of pressure, valve means adjustable in response to speed changes of the rotatable member for determining the separating pressure between the cylinder and piston, and means to maintain a pressure connection between the pressure separable parts and said valve means during rotation of the piston and cylinder.

6. A machine tool having a support, a rotatable member, an adjustable bearing for journaling the member in the support, hydraulically actuated means for effecting adjustment of the bearing including a piston and cylinder, said cylinder having an inlet and an outlet channel connected thereto between one cylinder head and the piston, a source of fluid pressure coupled to the inlet channel, a fixed resistance to fluid flow in the outlet channel, and a variable resistance to fluid flow in the inlet channel to determine the pressure on said bearing in accordance with the speed of rotation of the rotatable member and a relief valve on the inlet line to permit by-passing of excess fluid and thereby the maintenance of a constant pressure for each setting of the variable resistance.

7. A machine tool having a support, a rotatable member, an adjustable bearing for journaling the member in the support, hydraulically actuated means for effecting adjustment of the bearing including a piston and cylinder, said cylinder having an inlet and an outlet channel connected thereto between one cylinder head and the piston, a source of fluid pressure coupled to the inlet channel, a fixed resistance to fluid flow in the outlet channel, a variable resistance to fluid flow in the inlet channel whereby the pressure on said bearing may be varied in accordance with the speed of the rotatable member, a relief valve in the inlet channel to permit by-passing of excess fluid and the maintenance of constant pressure at the variable resistance, said resistance including an axially adjustable throttle valve and cam means graduated in accordance with the rate variation of the moving part for actuating said throttle valve.

8. A machine tool having a support, a rotatable member journaled in the support, a prime mover, a variable speed transmission coupling the prime mover to the rotatable part, a rotatable speed controller effective on said transmission to vary the rate of rotation of the movable part, one revolution of said controller effecting the full range of speeds of the transmission, a cam associated with the controller for movement therewith, an adjustable bearing for journaling the spindle in the support, hydraulically actuated means for varying the pressure on said bearing including a throttle valve, and means operatively connecting the throttle valve to said cam whereby actuation of the speed controller to vary the rate of rotation of the moving part will vary the pressure of said adjustable bearing.

9. A machine tool having a support, a rotatable member journaled in the support, a prime mover, a variable speed transmission coupling the prime mover to the rotatable part, a rotatable speed control device effective on said transmission to vary the rate of rotation of the movable part, one revolution of said control device effecting the full range of speeds of the transmission, a cam associated with the controller for movement therewith, an adjustable bearing for journaling said rotatable member in the support, hydraulically actuated means for varying the pressure of said bearing including a throttle valve, means operatively connecting the throttle valve to said cam whereby actuation of the speed controller to vary the rate of rotation of the rotatable member will vary the pressure on said adjustable bearing, power actuating means for the controller, and manual means for determining the coupling thereof.

10. A machine tool having a support, a rotatable member journaled in the support, a prime mover, a variable speed transmission coupling the prime mover to the rotatable part, a rotatable speed control device effective on said transmission to vary the rate of rotation of the movable part, one revolution of said control device effecting the full range of speeds of the transmission, a cam associated with the controller for movement therewith, an adjustable bearing for journaling said rotatable members in the support, hydraulically actuated means for varying the pressure with said bearing including a throttle valve, means operatively connecting the throttle valve to said cam whereby actuation of the speed controller to vary the rate of rotation of the moving part will vary the pressure of said adjustable bearing, power means for rotating said speed controller, manual means for determining the coupling of the power means to said controller, said power means including a clutch, and a plurality of control levers located at different operating stations and operatively connected to the clutch for varying the rate of rotation of the moving part and adjustment of the bearing pressure thereof.

11. A machine tool having a support, a rotatable member journaled in the support, a prime mover, a variable speed transmission coupling the prime mover to the rotatable part, a rotatable speed control effective on said transmission to vary the rate of rotation of the movable part, one revolution of said controller effecting the full range of speeds of the transmission, a cam associated with the controller for movement therewith, an adjustable bearing for journaling the spindle in the support, hydraulically actuated means for varying the pressure with said bearing including a throttle valve, means operatively connecting the throttle valve to said cam whereby actuation of the speed controller to vary the rate of rotation of the moving part will vary the pressure of said adjustable bearing, power actuated means for rotating said speed controller, manual means for controlling the coupling of the power means to said controller, and resilient means for maintaining the throttle valve in contact with said cam.

12. A machine tool comprising a support, a rotatable member, means for journaling said member in the support comprising concentric bearing portions relatively axially movable to vary the load carrying capacity thereof, hydraulically actuated means for effecting relative movement between said bearing portions to effect preloading thereof and power operable means to vary the amount of said preloading.

13. A machine tool comprising a support, a rotatable member, means for journaling said member in the support comprising concentric bearing portions, resilient means for maintaining separation between said portions to maintain a normal pressure on the parts, hydraulically actuated means for preloading the bearing portions and manually operable means to vary the amount of said preloading.

14. A machine tool having a support, a cutter spindle journaled therein, means for effecting rotation of the spindle including a prime mover, a variable speed transmission coupling the prime mover to the spindle, said transmission including a plurality of shiftable members, fluid operable means for shifting the individual members, a selector valve for determining the members to be shifted, an adjustable bearing for said spindle, fluid operable means for variably preloading the bearing, a control valve for said preloading means responsive to speed changes of the spindle for varying said preloading means, and a common source of fluid pressure for said selector valve and said control valve.

15. A machine tool including a support, a rotatable spindle, adjustable bearings for the spindle carried by the support and adjustable to vary the loading thereof, driving means for the spindle, means to vary the rate of propulsion thereof, means to vary the loading of the adjustable spindle bearings, and connections between said speed controlling and pre-loading means effective to vary the pre-loading pressure inversely as the rate of speed imparted to the spindle.

16. A machine tool or the like including a support, a rotatable spindle, means for selectively driving the spindle at various rates, bearings for the spindle, means for effecting varying pre-loadings of the spindle bearings, and selector means for simultaneously determining the spindle rate and the particular pre-loading pressure of the bearing for that rate.

17. A machine tool or the like including a support, bearings carried thereby, a spindle journaled in the bearings, means for pre-loading the bearings, means for driving the spindle at various rates, and means to simultaneously vary the rate of drive of the spindle and the pre-loading of its bearings.

18. A device of the character described including a support, adjustable bearings carried by the support, a spindle journaled in the bearings, power means variably to determine the rate of rotation of the spindle, and coupled power means to modify the pre-loading of the bearings in accordance with the determined rate.

19. A mechanism of the character described including a support, adjustable pre-loadable bearings carried by the support, a spindle journaled in said bearings, power means for effecting rotation of the spindle at various speeds, power actuable means for effecting a variable pre-loading of the spindle bearings, a rate determin or for the spindle, and a bearing pressure determinator coupled therewith for adjustment simultaneously with the rate determinator.

LESTER F. NENNINGER.